US008532665B2

(12) United States Patent
Li et al.

(10) Patent No.: US 8,532,665 B2
(45) Date of Patent: Sep. 10, 2013

(54) OVERLAY MICRO CELL STRUCTURE FOR UNIVERSAL MOBILE TELEPHONE SYSTEM NETWORK

(75) Inventors: Jun Li, Plainsboro, NJ (US); Alton Keel, Melbourne, FL (US); Wen Gao, Plainsboro, NJ (US); Shaily Verma, Mumbai (IN)

(73) Assignee: Thomson Licensing, Boulogne-Billancourt (FR)

( * ) Notice: Subject to any disclaimer, the term of this patent is extended or adjusted under 35 U.S.C. 154(b) by 1559 days.

(21) Appl. No.: 10/563,385

(22) PCT Filed: Jul. 11, 2003

(86) PCT No.: PCT/US03/21746
§ 371 (c)(1),
(2), (4) Date: Jan. 5, 2006

(87) PCT Pub. No.: WO2005/015924
PCT Pub. Date: Feb. 17, 2005

(65) Prior Publication Data
US 2006/0154668 A1 Jul. 13, 2006

(51) Int. Cl.
*H04W 36/00* (2009.01)
*H04W 40/00* (2009.01)
*H04L 12/56* (2006.01)

(52) U.S. Cl.
USPC ............ 455/444; 455/449; 455/446; 370/401

(58) Field of Classification Search
USPC .................. 455/444, 449, 446; 370/401, 402
See application file for complete search history.

(56) References Cited

U.S. PATENT DOCUMENTS

| 5,303,287 A | 4/1994 | Laborde |
| 5,546,443 A | 8/1996 | Raith |
| 5,594,782 A | 1/1997 | Zicker et al. |
| 6,058,302 A * | 5/2000 | Westerberg .................... 455/411 |
| 6,212,382 B1 * | 4/2001 | Watson et al. ................. 455/444 |
| 6,600,924 B1 * | 7/2003 | Sinivaara et al. ............. 455/444 |
| 6,954,645 B2 * | 10/2005 | Tsai et al. ...................... 455/449 |
| 6,959,048 B1 * | 10/2005 | Horneman et al. ........... 375/299 |

(Continued)

FOREIGN PATENT DOCUMENTS

| JP | 06177823 A | 6/1994 |
| JP | 08-065727 A | 3/1996 |

(Continued)

OTHER PUBLICATIONS

Search Report.

(Continued)

*Primary Examiner* — Christopher M Brandt
(74) *Attorney, Agent, or Firm* — Robert D. Shedd; Robert B. Levy

(57) ABSTRACT

A wireless telephony communications system includes at least one macro cell for communicating both voice and data with a mobile communications device across a first wireless link and at least one micro cell for communicating data with the mobile communications device across a second wireless communication link. Each micro cell communicates signaling information through the macro cell via a wireless link to a control element that manages the micro cells. Using a wireless link to communicate signaling between each micro cell and the control element in the UMTS system eliminates the need for a wired back haul link, thereby reducing access costs.

12 Claims, 1 Drawing Sheet

(56) References Cited

U.S. PATENT DOCUMENTS

| | | | |
|---|---|---|---|
| 7,096,019 B2 * | 8/2006 | Wang | 455/437 |
| 2002/0159409 A1 | 10/2002 | Wolfe et al. | |
| 2003/0003917 A1 * | 1/2003 | Copley et al. | 455/444 |
| 2003/0013452 A1 * | 1/2003 | Hunt et al. | 455/449 |
| 2003/0040306 A1 | 2/2003 | Kentaro et al. | |
| 2003/0185178 A1 * | 10/2003 | Chitrapu et al. | 370/335 |

FOREIGN PATENT DOCUMENTS

| | | |
|---|---|---|
| JP | 2000-092541 A | 3/2000 |
| JP | 2002-111579 A | 4/2002 |
| JP | 2002-204470 A | 7/2002 |
| JP | 2004-535143 A | 11/2004 |
| WO | WO0199466 | 12/2001 |
| WO | WO02087160 | 10/2002 |
| WO | WO03007645 | 1/2003 |
| WO | 03019971 A1 | 3/2003 |

OTHER PUBLICATIONS

Fumihide Kojima. "A Dynamic System Bandwidth Control Schema for Multi-layered Cellular System with Different Bandwidths," The Transactions of the Institute of Electronics, Information and Communication Engineers, vol. J81-B-II, pp. 269 to 277, the Institute of Electronics, Information, and Communication Engineers, Japan, Apr. 25, 1998.

Balakrisnan et al., The Ricochet System Architecture, pp. 1-3, Feb. 1, 2001 http://bwrc.eecs.berkeley.edu/research/Pico_Radio/docs/networkTopo/metricomTopo.htm.

Mendenhall, Deborah, Metricom weaving a wireless web, pp. 1-3, Jul. 7, 2000 http://www.post-gazette.com/businessnews/20000707metricom3.asp.

\* cited by examiner

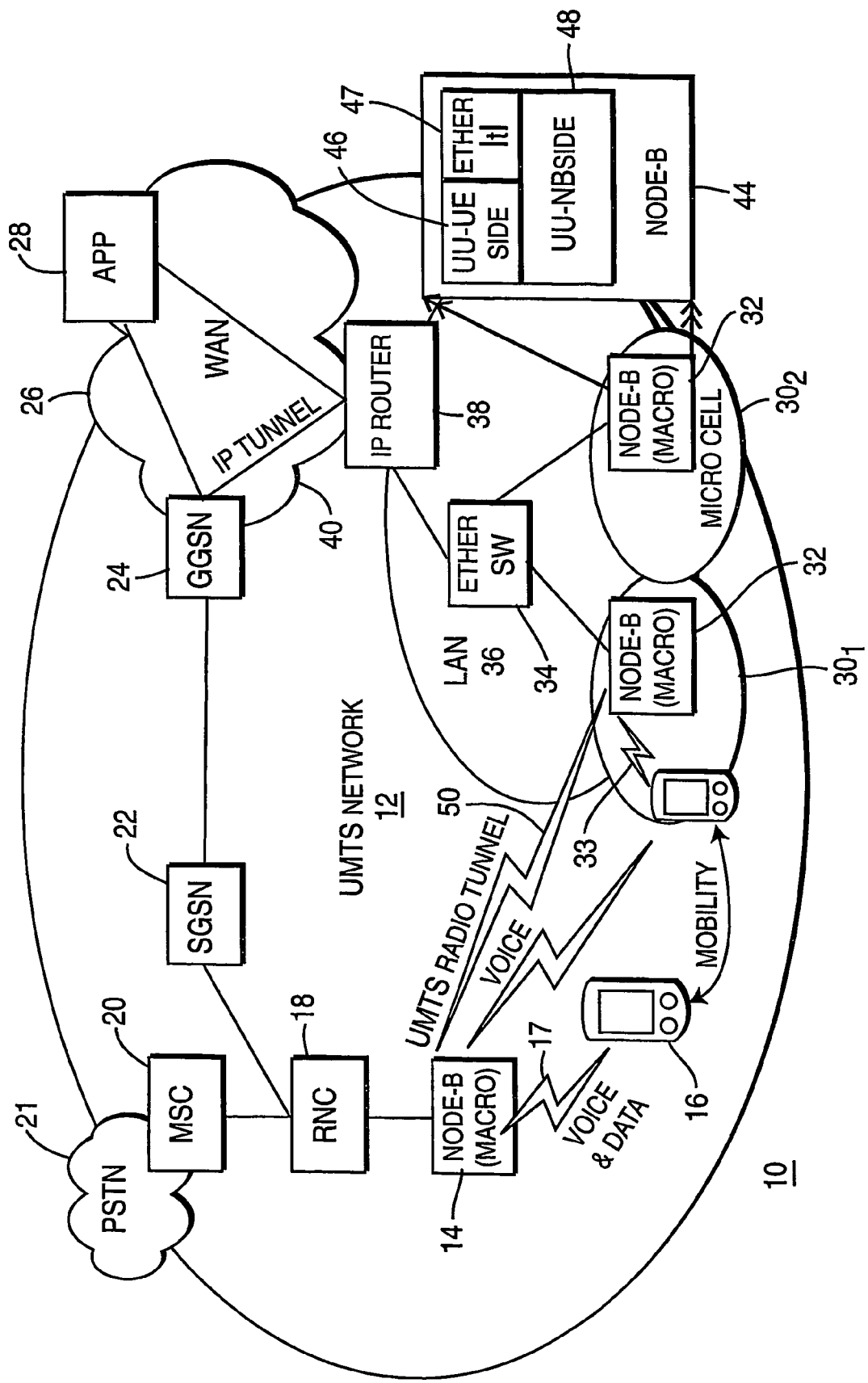

OVERLAY MICRO CELL STRUCTURE FOR UNIVERSAL MOBILE TELEPHONE SYSTEM NETWORK

This application claims the benefit, under 35 U.S.C. §365 of International Application PCT/US03/21746, filed Jul. 11, 2003, which was published in accordance with PCT Article 21(2) on Feb. 17, 2005 in English.

TECHNICAL FIELD

This invention relates to a wireless telephone network that affords improved access at relatively low cost.

BACKGROUND ART

Wireless telephony technology continues to evolve over time. Most recently, the European Telecommunications Standards Institute (ETSI) has promulgated a new standard for mobile telephony service, known as "Universal Mobile Telecommunications Service" or UMTS which offers broadband, packet-based transmission of voice, text, video and multimedia information at rates as high as 2 Mbs. The proposed UMTS standard describes a wireless network that includes one or more radio access nodes, each typically referred to as a "Node B." One or more Radio Network Controllers (RNC) exist within the UMTS network to manage the radio access nodes. Each RNC has a broadband connection, typically in the form of an Asynchronous Transport Mode (ATM) Link, to a UMTS core network that provides Authorization, Authentication and Accounting (AAA) Functions.

Advances in the field of wireless LAN technology have resulted in the emergence of publicly accessible wireless LANs (e.g., "hot spots") at rest stops, cafes, libraries and similar public facilities. Presently, wireless LANs offer mobile terminal users access to a private data network, such as a Corporate Intranet, or a public data network such as the Internet. The relatively low cost to implement and operate a wireless LAN, as well as the available high bandwidth (usually in excess of 10 Megabits/second) makes the wireless LAN an ideal access mechanism through which the mobile terminal user can exchange packets with an external entity.

Given the advantages offered by wireless LANS, various standards bodies have under consideration proposals for loosely coupling the UMTS and wireless LAN networks to offer complimentary services. A loose coupling implies no system relations at network layer and/or below in the two networks. Generally, without tight coupling between the UMTS network and the wireless LAN, which is a fairly costly proposition, the UMTS network operator cannot effectively control subscriber access to the wireless LAN. Hence, the revenue generated from wireless LAN access remains with the wireless LAN operator.

To compete with the wireless LAN technology, a UMTS network operator could offer a micro-cell solution, i.e. increase the number of radio access nodes, to afford greater access. However, increasing the number of access nodes significantly increases equipment and deployment costs.

Thus, there is need for a technique for increasing the capacity of a UMTS network at a relatively low cost.

BRIEF SUMMARY OF THE INVENTION

Briefly, there is provided a method for communicating information in a wireless network that has at least one macro cell capable of exchanging voice and data with a mobile communications device across a first wireless link, and at least one micro cell capable of communicating data at a relatively high bandwidth with the mobile communications device across a second wireless link. Typically, the micro cell has a smaller coverage area and higher capacity per user than the macro cell. Responsive to the receipt at the micro cell of an access request from a mobile terminal via the second wireless link, the micro cell communicates signaling information across a third wireless channel to the macro cell for transmission to a control element in the wireless network. The wireless network controls the micro cell in response to the signaling information. Communicating signaling information from the micro cell to the macro cell through a wireless channel advantageously avoids the need a wired back haul circuit to communicate such signaling information, thus allowing micro cell deployment at lower cost.

BRIEF SUMMARY OF THE DRAWING

FIG. 1 depicts a block schematic diagram of a wireless communications network in accordance with a preferred embodiment of the present principles.

DETAILED DESCRIPTION

FIG. 1 illustrates a block schematic diagram of a wireless communications system 10 in accordance with a preferred embodiment of the present principles. The system 10 includes a wireless network 12, which preferably has an architecture corresponding to that described in the well-known Universal Mobile Telephone System (UMTS) standard. Accordingly, the network 12 bears the designation "UMTS network." Within the UMTS network 12, there exists at least one, and preferably, a plurality of macro cells, each comprising a radio access node 14 which is sometimes referred to as a "Node B." Each radio access node 14 includes a radio transceiver (not shown) capable of exchanging both voice and data traffic with a mobile communications device 16 across a wireless link 17. The mobile communications device 16 can include a wireless telephony handset, a wireless Personal Data Assistant (PDA) or a personal computer having a wireless modem.

Within the UMTS network 12, each radio access node 14 operates under the control of a Radio Network Controller (RNC), exemplified by RNC 18. Each RNC 18 manages at least one, and preferably, a plurality of radio access nodes 14 to assure that each node provides the appropriate radio resources required by each mobile communications device in communications therewith. A Mobile Switching Center (MSC) 20 couples each RNC 18 to a Public Switched Telephone Network (PSTN) 21 to enable the mobile communications device 16 to exchange voice traffic with one or more telephone subscribers served by the PSTN.

Each RNC 18 interfaces with an associated control element in the form of a Serving General Packet Radio Service Node (SGSN) 22. While FIG. 1 illustrates a single SGSN 22, the wireless telephony network 12 can include a plurality of SGSNs, each associated with one or more RNCs 18. Each SGSN 22 identifies and authenticates each mobile communications device 16 seeking access via a corresponding access radio node 14 managed by an associated RNC 20. In addition to performing authorization and authentication, each SGSN 22 also accounts for the services rendered to the mobile communications devices 16 while in communications with the network 12.

Within the UMTS network 12, a Gateway GPRS Support Node (GGSN) 24 provides an interface between the SGSN 22 and an IP network 26 depicted as a Wide Area Network (WAN) that could include a private data network, or a public data network such as the Internet or combination thereof. In its role as the interface between the SGSN 22 and the WAN 26, the GGSN 24 assigns an IP address to each mobile communications device, such as the device 16, seeking access to the WAN 26. In this way, the mobile communications device 16 can gain access to information stored on one or more servers in the WAN 26, such as server 28.

In practice, the wireless link 17 offers limited bandwidth. Thus, exchanging large files, especially those containing text, audio, video or a combination thereof, between the mobile communications device 16 and the radio access node 14 become impractical. Consequently, subscribers of UMTS service often seek broadband access via a wireless LAN (not shown), rather than through the UMTS network. Such subscriber migration causes the UMTS network operator to loose revenue.

The bandwidth constraint in the UMTS network 12 is overcome by the addition of at least one, and preferably, a plurality of micro cells, exemplified by micro cells $30_1$ and $30_2$. Each micro cell comprises a radio access node 32 (i.e., a "Node B") whose structure resembles the structure of an access point (not shown) of the type found in wireless LANs. With such a structure, the radio access node 32 comprising each micro cell can provide a high bandwidth (i.e., a broadband) wireless channel 33 for exchanging data packets with the mobile communications device 16.

An Ethernet switch 34 comprising part of a Local Area Network 36 provides a connection between an IP router 38 and each of the micro cells $30_1$ and $30_2$. The IP router 38 routes IP packets between the Ethernet switch 34 and the WAN 26. A first IP tunnel 40 within the WAN 26 carries packets between the GGSN 24 of the UMTS network 12 and the IP router 38. In this way, a mobile communication device, such as device 16, upon gaining access to a micro cell, such as micro cell $30_1$ can thus establish a high-speed data connection through the LAN 36 to the WAN 26 to enable the server 28 in the WAN to download information via a link 42.

The radio access node 32 comprising each micro cell includes a protocol stack 44 that holds the various protocols needed to facilitate wireless packet communication with the mobile communications device 16. In the illustrated embodiment, the protocol stack 44 includes an uplink interface (UU-UEside) 46 that has an associated Ethernet interface (etherItf) 47. In addition to the uplink interface 46, the protocol stack 44 also includes a downlink interface (UU-NBside) 48.

To facilitate seamless transition of data communication between the radio access node 14 and the radio access node 32, an exchange of signaling information generally must occur between the radio access node 32 and the SGSN 22 upon access of a micro cell by the mobile communications device 16. The exchange of signaling information allows the SGSN 22 to control the radio access node 32, and in particular, to control authorization and authentication of the mobile communications device 16 seeking access to the radio access node. In connection with controlling micro cell (radio access node) 32 and the macro cell (radio access node) 14, the SGSN 22 will assign codes and power settings to enable the mobile communication device 16 to communicate with a macro cell and a micro cell simultaneously. In the past, a wired ATM back haul link (not shown) provided the signaling path between each radio access node 32 and the SGSN 22. Such back haul links while effective, are nonetheless expensive to deploy and maintain, which ultimately puts the micro cells $30_1$ and $30_2$ at a operating cost-disadvantage as compared the access points (not shown) of a wireless LAN.

In accordance with the present principles, the exchange of signaling information between the radio access node 32 and the SGSN 22 occurs over a UMTS radio tunnel (channel) 50 extending between the radio access nodes 32 and 14. The UMTS radio channel 50 provides a virtual connection that enables the radio access node 32 to exchange signaling information with the SGSN 22, thereby obviating the need for a wired link and the attendant cost disadvantage associated therewith. Rather than utilize a separate radio channel to carry signaling information for each individual micro cell, a single UMTS radio tunnel can encapsulates all UMTS signaling messages passing between the micro cells and the radio access node 14. In practice, each radio access node 32 transmits the signaling information at relatively low rate, resulting in little interference at the radio access node 14.

To reduce or virtually eliminate the interference at each mobile device 16 as well as at each radio access node 14, a single source, such as a mobile communications device 16 or one of the radio access nodes 14 and 32 will use different channels for voice/data/signaling along with different channelization codes, but the same scrambling code. Different sources will use different scrambling codes. Typically, each mobile communications device, such as device 16, uses different radio channels (i.e., different orthogonal channelization code for CDMA) for uplinked voice and data, thus virtually eliminating the possibility of interference at the radio access nodes 14 and 32. Each mobile communications device, such as device 16, receives signals from the radio access nodes 14 and 32 during a down link mode using different scrambling codes so that the cross interference between the two signals is small if signal powers at the device 16 are close to each other.

The communications system 10, with its micro cells $30_1$ and $30_2$, affords low cost access by using the wireless tunnel 50 to communicate signaling information between the micro cells and RNC 18, and by separating the voice traffic and data traffic as between the macro cell (radio access node) 14 and the micro cells, respectively.

Therefore, the foregoing describes a communications system that offers improved access at low cost.

The invention claimed is:

1. A method for achieving wireless communications in a network having at least one macro cell for communicating both voice and data with a mobile communications device across a first wireless link and, at least one micro cell, with a smaller coverage area and higher capacity per user than the at least one macro cell, for communicating data with the mobile communications device across a second wireless communication link, the method comprising the steps of:
   communicating signaling information directly between the at least one micro cell and the at least one macro cell via a third wireless channel in response to access of the at least one micro cell by the mobile communications device; and
   controlling the operation of the at least one micro cell responsive to the signaling information.

2. The method according to claim 1 wherein step of controlling the at least one micro cell includes the step of managing access to the at least one micro cell by the mobile communications device.

3. The method according to claim 1 wherein the step of communicating signaling information via the third wireless channel includes the step communicating signaling information from each mobile communications device separately.

4. The method according to claim 1 wherein the step of communicating signaling information via the third wireless channel includes the step of encapsulating signaling information from a plurality of mobile communication devices in a common packet.

5. The method according to claim 1 further comprising the step of assigning to the mobile communication device codes and power settings to enable the mobile communication device to communicate with the at least one macro cell and the at least one micro cell simultaneously.

6. A wireless communications system, comprising:
- at least one macro cell for communicating both voice and data with a mobile communications device across a first wireless link
- at least one micro cell having a smaller coverage and higher capacity per user than the at least one macro cell for communicating data with the mobile communications device across a second wireless communication link;
- a control element for controlling at least the operation of the at least one macro cell; and
- a third wireless channel for directly communicating signaling information between the at least one micro cell and the at least one macro cell in response to access of the at least one micro cell by the mobile communications device to enable the control element to also control the operation of the at least one micro cell.

7. The system according to claim 6 wherein the control element comprises a Service General Packet Radio Service Node (SGSN).

8. The system according to claim 6 wherein the control element manages access to the at least one micro cell by the mobile communications device.

9. The system according to claim 6 wherein each micro cell separately communicates signaling information from each mobile communication device across the third wireless channel.

10. The system according to claim 6 wherein the signaling information of each of a plurality of micro cells is encapsulated into a common packet for communication across the third wireless communication channel.

11. The system according to claim 6 wherein the control element assigns to the mobile communication device codes and power settings to enable the mobile communication device to communicate with the at least one macro cell and the at least one micro cell simultaneously.

12. The system according to claim 7 wherein the control element further comprises:
- a Gateway General Packet Radio Service Serving Node (GGSN); and
- an Internet Protocol tunnel for linking the GGSN to an Internet Protocol gateway.

* * * * *